UNITED STATES PATENT OFFICE.

ALWIN MITTASCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

CATALYTIC AGENTS AND PROCESS OF MAKING THEM.

1,173,532.  Specification of Letters Patent.  Patented Feb. 29, 1916.

No Drawing.  Application filed July 10, 1913. Serial No. 778,242.

*To all whom it may concern:*

Be it known that I, ALWIN MITTASCH, Ph. D., citizen of the German Empire, residing at Ludwigshafen-on-the-Rhine, Germany, have invented new and useful Improvements in Catalytic Agents and Processes of Making Them. of which the following is a specification.

In the specification of Patent No. 1,094,194 is described the production of ammonia catalytically by passing a mixture containing nitrogen and hydrogen over a catalytic agent containing suitable metal or metallic compound and a substance which promotes the activity of such metal or metallic compound.

I have now found that I can obtain catalytic agents of exceptional activity by bringing ruthenium or a compound thereof onto a carrier in the form of a solution containing a compound of an acid oxid of ruthenium with a strong base, for instance alkali metal ruthenate. The contact mass thus obtained can be employed for catalytic purposes either directly or after undergoing a separate reducing treatment, for instance it can be heated or acted upon with a reducing agent. Hereby I finally obtain a catalytic agent containing ruthenium, either free or combined, and generally also a strong base which is characterized by being exceptionally active, and by possessing the catalytic agent spread out on the carrier so as to obtain the greatest possible surface contact action with a definite amount of catalytic agent.

If desired, to the aforesaid oxygen compounds of ruthenium, there can be added other suitable substances or metallic compounds or even the metals themselves, and such additions may be indifferent diluents or may be promoters which improve the activity of the catalytic agent.

As instances of materials which can be employed as carriers for the ruthenium or compound thereof, I mention asbestos, magnesia, alumina, pumice, meerschaum, clay, cement, kieselguhr, metals and carbon, without however in any way restricting my invention to the use of these materials. If desired, the carrier can be formed by precipitation in the solution of the ruthenate.

The catalytic agents obtained according to my invention can be used for any suitable purpose, for instance they can be employed for catalytic oxidation processes or in the hydrogenization of various substances and for producing ammonia from a mixture of nitrogen and hydrogen, in the manner described for instance in the aforesaid Patent No. 1,094,194.

The following example will serve to illustrate further the nature of my invention, which, however, is not limited to this example.

Soak grains of meerschaum in a solution of potassium ruthenate in dilute caustic potash solution and then evaporate the water, preferably *in vacuo*, so that the carrier contains about from two to five per cent. of potassium ruthenate. The product is then treated with a reducing agent or it can directly be used *e. g.* for the catalytic production of ammonia, reduction in this case taking place on passing the mixture of hydrogen and nitrogen at a raised temperature over the contact mass.

Now what I claim is:—

1. The process of producing a catalytic agent free from halogen by applying to a carrier a solution containing a compound of an acid oxid of ruthenium with a strong base and treating with a reducing agent.

2. The process of producing a catalytic agent free from halogen by applying a solution of alkali metal ruthenate to a carrier and treating with a reducing agent.

3. The process of producing a catalytic agent free from halogen by applying a solution of alkali metal ruthenate to asbestos and treating with a reducing agent.

4. A catalytic agent containing a carrier, ruthenium and a strong base and being free from halogen.

5. A catalytic agent containing a carrier, ruthenium and a basic oxygen-containing compound of of an alkali metal and being free from halogen.

In testimony whereof I have hereunto set my hand in the presence of two subscribing witnesses.

ALWIN MITTASCH.

Witnesses:
JOSEPH PFEIFFER,
J. ALEC. LLOYD.